United States Patent
Liu et al.

(10) Patent No.: US 10,931,412 B2
(45) Date of Patent: Feb. 23, 2021

(54) METHOD AND APPARATUS OF OBTAINING FEEDBACK OF HARQ ACKNOWLEDGMENT INFORMATION

(71) Applicant: Alcatel Lucent, Nozay (FR)

(72) Inventors: Jianguo Liu, Shanghai (CN); Tao Tao, Shanghai (CN); Yan Meng, Shanghai (CN); Zhe Luo, Shanghai (CN); Dawei Wang, Shanghai (CN); Junrong Gu, Shanghai (CN); Gang Shen, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/089,664

(22) PCT Filed: Mar. 31, 2017

(86) PCT No.: PCT/IB2017/000464
§ 371 (c)(1),
(2) Date: Sep. 28, 2018

(87) PCT Pub. No.: WO2017/168257
PCT Pub. Date: Oct. 5, 2017

(65) Prior Publication Data
US 2019/0123861 A1    Apr. 25, 2019

(30) Foreign Application Priority Data

Apr. 1, 2016 (CN) .......................... 201610204352.8

(51) Int. Cl.
*H04W 72/04* (2009.01)
*H04L 1/18* (2006.01)
(Continued)

(52) U.S. Cl.
CPC .......... *H04L 1/1861* (2013.01); *H04L 1/1812* (2013.01); *H04L 1/1854* (2013.01);
(Continued)

(58) Field of Classification Search
CPC ... H04L 1/1812; H04L 1/1854; H04L 1/1861; H04W 72/0413; H04W 72/0446; H04W 72/0453; H04W 74/0808
See application file for complete search history.

(56) References Cited

U.S. PATENT DOCUMENTS 10,743,344 B2 * 8/2020 Noh .................... H04L 1/1887
2011/0044239 A1 2/2011 Cai et al.
(Continued)

FOREIGN PATENT DOCUMENTS

WO    2016047727    3/2016

OTHER PUBLICATIONS

International Search Report for PCT/IB2017/000464 dated Jul. 7, 2017.
(Continued)

*Primary Examiner* — Robert J Lopata
(74) *Attorney, Agent, or Firm* — Fay Sharpe LLP

(57) ABSTRACT

Embodiments of the present disclosure provide a method and apparatus of obtaining feedback of HARQ acknowledgment information. The method comprises allocating to UE an uplink control channel resource for report of HARQ acknowledgment information related to downlink data transmission on an unlicensed carrier. The method also comprises obtaining feedback of the HARQ acknowledgment information from the UE within a predefined deferral window. The predefined deferral window specifies a minimum delay and a maximum delay for report of the HARQ acknowledgment information. The embodiments of the present disclosure may increase the reliability and reduce the latency of HARQ acknowledgment information feedback. In addition, the embodiments of the present disclosure may not only be for LAA scenarios, but also may be extended to standalone LAA access scenarios on unlicensed carriers.

20 Claims, 7 Drawing Sheets

(51) Int. Cl.
*H04W 16/14* (2009.01)
*H04W 74/08* (2009.01)

(52) U.S. Cl.
CPC ....... *H04W 16/14* (2013.01); *H04W 72/0413* (2013.01); *H04W 72/0446* (2013.01); *H04W 72/0453* (2013.01); *H04W 74/0808* (2013.01)

(56) References Cited

U.S. PATENT DOCUMENTS

| | | |
|---|---|---|
| 2013/0235821 A1 | 9/2013 | Chen et al. |
| 2014/0204854 A1 | 7/2014 | Freda et al. |
| 2015/0055589 A1 | 2/2015 | Yerramalli et al. |
| 2016/0036578 A1* | 2/2016 | Malladi ................ H04L 5/0057 370/329 |
| 2016/0218832 A1* | 7/2016 | Dabeer ................ H04L 1/1671 |
| 2016/0233989 A1* | 8/2016 | Belghoul ................ H04L 5/14 |
| 2017/0079013 A1* | 3/2017 | Noh ..................... H04W 76/27 |
| 2017/0163388 A1* | 6/2017 | Wiemann ............. H04L 1/1851 |
| 2017/0280448 A1 | 9/2017 | Takeda et al. |
| 2018/0175973 A1* | 6/2018 | Rosa ..................... H04L 1/1812 |
| 2018/0254858 A1* | 9/2018 | He ......................... H04L 1/0001 |
| 2018/0270860 A1* | 9/2018 | Bhorkar ............ H04W 72/0406 |
| 2019/0036831 A1* | 1/2019 | Li ..................... H04W 74/0816 |
| 2019/0037601 A1* | 1/2019 | Noh ...................... H04L 1/1887 |
| 2019/0053265 A1* | 2/2019 | Kim ....................... H04W 74/08 |
| 2019/0082436 A1* | 3/2019 | Huang ................. H04W 16/14 |
| 2019/0140727 A1* | 5/2019 | Kim ....................... H04W 72/12 |
| 2019/0150170 A1* | 5/2019 | Park .................. H04W 72/1268 |

OTHER PUBLICATIONS

CATT, Support of PUCCH for LAA Scell, 3GPP TSG-RAN WG1#84 R1-160357, Feb. 19, 2016.

Qualcom Incorporated, PUCCH design details, 3GPP TSG-RAN WG1#84 R1-160888, Feb. 19, 2016.

English Bibliography of PCT Application No. WO2016047727A1, Published on Mar. 31, 2016, Printed by Derwent Innovation, 5 pages.

PCT Patent Application No. PCT/IB2017/000464, Written Opinion of the International Searching Authority, dated Jul. 7, 2017, 7 pages.

* cited by examiner

METHOD AND APPARATUS OF OBTAINING FEEDBACK OF HARQ ACKNOWLEDGMENT INFORMATION

FIELD

Embodiments of the present disclosure generally relate to wireless communications, and more particularly, to a method and apparatus of obtaining feedback of hybrid automatic repeat request (HARQ) acknowledgment information, and a method and apparatus of reporting HARQ acknowledgment information.

BACKGROUND

In 3GPP RAN #70 meeting, a new Work Item on enhanced License Assisted Access (eLAA) for LTE was approved for Release 14 study. The objective of this Work Item is to specify uplink (UL) support for LAA secondary cell (SCell) operation in unlicensed spectrums. If a physical uplink control channel (PUCCH) is only transmitted on licensed carriers in primary cells (PCell) for LAA, all the procedures defined for PUCCH in current specifications can be reused. However, there are a large number of carriers in unlicensed bands, so it is likely that a licensed-carrier PCell is aggregated with numerous unlicensed-carrier LAA SCells, which will cause high PUCCH load and inter-cell interference in the licensed-carrier PCell. In this sense, offloading the PUCCH transmission to unlicensed-carrier SCells can be beneficial. Furthermore, considering forward compatibility for the standalone LAA and dual/multiple-connectivity operation on unlicensed carriers, PUCCH transmission on LAA SCells needs to be considered as part of LAA Release 14 to avoid design incompatibilities going ahead. Therefore, the following agreements are achieved in 3GPP TSG RAN #84 meeting:

Transmission of HARQ acknowledgment information for serving cells on licensed carriers in an LAA SCell is not supported;

Transmission of HARQ acknowledgment information and channel state information (CSI) for serving cells on unlicensed carriers in an LAA SCell is supported.

However, if the PUCCH is transmitted in an LAA SCell, listen before talk (LBT) would be needed for PUCCH to ensure the fairness on accessing the channel. Unlike the legacy LTE system where dedicated UL subframe/resource is guaranteed without any uncertainty, in LAA, if user equipment (UE) cannot grab the channel for PUCCH transmission in the LAA SCell in a subframe where HARQ acknowledgment information needs to be transmitted, the HARQ acknowledgment information transmission could be dropped for legacy HARQ timing mechanism in LTE. In this case, uplink control information (UCI) transmission might be varied depending on a clear channel assessment (CCA) result due to LBT uncertainty, so transmission timing of HARQ acknowledgment information needs further study to achieve the HARQ acknowledgment information feedback on unlicensed carriers.

Furthermore, the uncertainties due to LBT would further impact the reliability of HARQ acknowledgment information feedback as well as delay on unlicensed carriers. For example, if the channel on unlicensed carriers is busy for a long time, the latency of downlink (DL) packet delivery might be very high, and the Evolved Node B (eNB) could not schedule DL transmission for UE at the unlicensed carrier due to the limitation on the maximum number of DL HARQ process. In this case, it is also necessary to increase the reliability of UL HARQ acknowledgment information on the unlicensed carriers for LAA.

Therefore, HARQ timing enhancement is required for support of PUCCH transmission in LAA SCells.

SUMMARY

Therefore, in order to solve or at least partially alleviate the above problems in the prior art, there is a need to introduce a mechanism to increase the reliability of HARQ acknowledgment information feedback and reduce the latency of the same.

In a first aspect, there is provided a method of obtaining feedback of HARQ acknowledgment information. The method comprises: allocating to user equipment (UE) an uplink control channel resource for report of HARQ acknowledgment information related to downlink data transmission on an unlicensed carrier; and obtaining feedback of the HARQ acknowledgment information from the UE within a predefined deferral window, the predefined deferral window specifying a minimum delay and a maximum delay for report of the HARQ acknowledgment information.

In some embodiments, the HARQ acknowledgment information includes one or more pieces of HARQ acknowledgment information within a predefined report window.

In some embodiments, allocating to the UE the uplink control channel resource comprises: allocating to the UE the uplink control channel resource on an unlicensed carrier.

In some embodiments, the unlicensed carrier on which the HARQ acknowledgment information is reported is the same as or different from the unlicensed carrier on which the downlink data transmission is performed.

In some embodiments, the unlicensed carrier on which the HARQ acknowledgment information is reported includes one of a plurality of candidate unlicensed carriers that are pre-configured.

In some embodiments, the plurality of candidate unlicensed carriers at least includes a first unlicensed carrier and a second unlicensed carrier, and the first unlicensed carrier includes the unlicensed carrier on which the downlink data transmission is performed, the second unlicensed carrier being different from the first unlicensed carrier.

In some embodiments, allocating to the UE the uplink control channel resource comprises: reserving the same uplink control channel resource for a plurality of downlink data transmissions for the UE.

In some embodiments, reserving the same uplink control channel resource for the plurality of downlink data transmissions for the UE comprises: in response to scheduling one of the plurality of downlink data transmissions for the UE in a first subframe, reserving the same uplink control channel resource for the UE in a plurality of subframes subsequent to the first subframe.

In some embodiments, allocating to the UE the uplink control channel resource comprises: independently configuring an uplink control channel resource for each downlink data transmission for the UE.

In some embodiments, independently configuring the uplink control channel resource for each downlink data transmission for the UE comprises: in response to scheduling a downlink data transmission for the UE in a second subframe, configuring the uplink control channel resource for the UE in a predefined subframe subsequent to the second subframe.

In some embodiments, the predefined report window is implicitly determined based on an uplink control information (UCI) format, the number of codewords and the number of aggregated unlicensed carriers for report of the HARQ acknowledgment information that are used by the UE.

In some embodiments, the method further comprises transmitting a control command to the UE, the control command carrying an indication of the uplink control channel resource.

In some embodiments, the report window is configured via the control command.

In some embodiments, allocating to the UE the uplink control channel resource comprises: allocating to the UE the uplink control channel resource on a licensed carrier in a serving cell of the UE.

In some embodiments, the method further comprises in response to determining that the uplink control channel resource on the licensed carrier in a predefined uplink subframe is available, transmitting a trigger command to the UE, the trigger command instructing the UE to switch from the unlicensed carrier to the licensed carrier for report of the HARQ acknowledgment information.

In some embodiments, the trigger command carries an indication of the uplink control channel resource on the licensed carrier.

In some embodiments, the indication of the uplink control channel resource includes an index of the uplink control channel resource and an index of the predefined uplink subframe.

In some embodiments, the indication of the uplink control channel resource includes an index of the uplink control channel resource, and an index of the predefined uplink subframe is determined based on a position of a subframe in which the trigger command is transmitted.

In a second aspect, there is provided a method for reporting HARQ acknowledgment information. The method comprises: obtaining from a base station an uplink control channel resource for report of HARQ acknowledgment information related to downlink data transmission on an unlicensed carrier; and reporting the HARQ acknowledgment information within a predefined deferral window by using the uplink control channel resource, the predefined deferral window specifying a minimum delay and a maximum delay for report of the HARQ acknowledgment information.

In some embodiments, the HARQ acknowledgment information includes one or more pieces of HARQ acknowledgment information within a predefined report window.

In some embodiments, the uplink control channel resource includes an uplink control channel resource on an unlicensed carrier.

In some embodiments, the unlicensed carrier on which the HARQ acknowledgment information is reported is the same as or different from the unlicensed carrier on which the downlink data transmission is performed.

In some embodiments, the uplink control channel resource includes: the same uplink control channel resource that is reserved by the base station for a plurality of downlink data transmissions for the UE.

In some embodiments, reporting the HARQ acknowledgment information comprises: in response to being scheduled for downlink data transmission in a first subframe, detecting a transmission status of the unlicensed carrier in a plurality of subframes subsequent to the first subframe; and in response to the transmission status of the unlicensed carrier being a free status in one of the plurality of subframes, reporting the HARQ acknowledgment information on the unlicensed carrier.

In some embodiments, the uplink control channel resource includes an uplink control channel resource that is independently configured by the base station for each downlink data transmission for the UE.

In some embodiments, reporting the HARQ acknowledgment information comprises: in response to being scheduled for downlink data transmission in a second subframe, detecting a transmission status of the unlicensed carrier in a predefined subframe subsequent to the second subframe; and in response to the transmission status of the unlicensed carrier being a free status in the predefined subframe, reporting the HARQ acknowledgment information on the unlicensed carrier.

In some embodiments, the unlicensed carrier on which the HARQ acknowledgment information is reported includes one of a plurality of candidate unlicensed carriers that are pre-configured by the base station.

In some embodiments, the plurality of candidate unlicensed carriers at least includes a first unlicensed carrier and a second unlicensed carrier, and the first unlicensed carrier includes the unlicensed carrier on which the downlink data transmission is performed, the second unlicensed carrier being different from the first unlicensed carrier.

In some embodiments, the uplink control channel resource includes: the same uplink control channel resource that is reserved by the base station for a plurality of downlink data transmissions for the UE.

In some embodiments, reporting the HARQ acknowledgment information comprises: in response to being scheduled for downlink data transmission in a first subframe, detecting a transmission status of each of the plurality of candidate unlicensed carriers in a plurality of subframes subsequent to the first subframe; and in response to the transmission status of one of the plurality of candidate unlicensed carriers being a free status in one of the plurality of subframes, reporting the HARQ acknowledgment information on the one of the plurality of candidate unlicensed carriers.

In some embodiments, the uplink control channel resource includes an uplink control channel resource that is independently configured by the base station for each downlink data transmission for the UE.

In some embodiments, reporting the HARQ acknowledgment information comprises: in response to being scheduled for downlink data transmission in a second subframe, detecting a transmission status of each of the plurality of candidate unlicensed carriers in a predefined subframe subsequent to the second subframe; in response to the transmission status of one of the plurality of candidate unlicensed carriers being a free status in the predefined subframe, reporting the HARQ acknowledgment information on the one of the plurality of candidate unlicensed carriers.

In some embodiments, the predefined report window is implicitly determined based on an uplink control information format, the number of codewords and the number of aggregated unlicensed carriers for report of the HARQ acknowledgment information that are used by the UE.

In some embodiments, the method further comprises receiving a control command from the base station, the control command carrying an indication of the uplink control channel resource.

In some embodiments, the report window is configured via the control command.

In some embodiments, the uplink control channel resource comprises: an uplink control channel resource on a licensed carrier in a serving cell of the UE.

In some embodiments, the method further comprises receiving a trigger command from the base station, the trigger command instructing the UE to switch from the unlicensed carrier to the licensed carrier for report of the HARQ acknowledgment information on the licensed carrier in a predefined uplink subframe.

In some embodiments, the trigger command carries an indication of the uplink control channel resource on the licensed carrier.

In some embodiments, the indication of the uplink control channel resource includes an index of the uplink control channel resource and an index of the predefined uplink subframe.

In some embodiments, the indication of the uplink control channel resource includes an index of the uplink control channel resource, and an index of the predefined uplink subframe is determined based on a position of a subframe in which the trigger command is transmitted.

In a third aspect, there is provided an apparatus for obtaining feedback of HARQ acknowledgment information. The apparatus comprises: an allocating unit configured to allocate to user equipment (UE) an uplink control channel resource for report of HARQ acknowledgment information related to downlink data transmission on an unlicensed carrier; and a feedback obtaining unit configured to obtain feedback of the HARQ acknowledgment information from the UE within a predefined deferral window, the predefined deferral window specifying a minimum delay and a maximum delay for report of the HARQ acknowledgment information.

In some embodiments, the HARQ acknowledgment information includes one or more pieces of HARQ acknowledgment information within a predefined report window.

In some embodiments, the allocating unit is further configured to allocate to the UE the uplink control channel resource on an unlicensed carrier.

In some embodiments, the unlicensed carrier on which the HARQ acknowledgment information is reported is the same as or different from the unlicensed carrier on which the downlink data transmission is performed.

In some embodiments, the unlicensed carrier on which the HARQ acknowledgment information is reported includes one of a plurality of candidate unlicensed carriers that are pre-configured.

In some embodiments, the plurality of candidate unlicensed carriers at least includes a first unlicensed carrier and a second unlicensed carrier, and the first unlicensed carrier includes the unlicensed carrier on which the downlink data transmission is performed, the second unlicensed carrier being different from the first unlicensed carrier.

In some embodiments, the allocating unit is further configured to reserve the same uplink control channel resource for multiple downlink data transmissions for the UE.

In some embodiments, the allocating unit is further configured to: in response to scheduling one of the plurality of downlink data transmissions for the UE in a first subframe, reserve the same uplink control channel resource for the UE in a plurality of subframes subsequent to the first subframe.

In some embodiments, the allocating unit is further configured to independently configure an uplink control channel resource for each downlink data transmission for the UE.

In some embodiments, the allocating unit is further configured to: in response to scheduling a downlink data transmission for the UE in a second subframe, configure the uplink control channel resource for the UE in a predefined subframe subsequent to the second subframe.

In some embodiments, the predefined report window is implicitly determined based on the uplink control information (UCI) format, the number of codewords and the number of aggregated unlicensed carriers for report of the HARQ acknowledgment information that are used by the UE.

In some embodiments, the apparatus further comprises: a sending unit configured to send a control command to the UE, the control command carrying an indication of the uplink control channel resource.

In some embodiments, the sending unit is further configured to configure the report window via the control command.

In some embodiments, the allocating unit is further configured to allocate to the UE the uplink control channel resource on a licensed carrier of a serving cell of the UE.

In some embodiments, the sending unit is further configured to: in response to determining the uplink control channel resource at the licensed carrier in a predefined uplink subframe is available, send to the UE a trigger command that instructs the UE to switch from the unlicensed carrier to the licensed carrier for report of the HARQ acknowledgment information.

In some embodiments, the trigger command carries an indication of the uplink control channel resource at the licensed carrier.

In some embodiments, the indication of the uplink control channel resource comprises an index of the uplink control channel resource and an index of the predefined uplink subframe.

In some embodiments, the indication of the uplink control channel resource comprises an index of the uplink control channel resource, and an index of the predefined uplink subframe is determined based on a position of a subframe in which the trigger command is transmitted.

In a fourth aspect, there is provided an apparatus for reporting HARQ acknowledgment information. The apparatus comprises: a resource obtaining unit configured to obtain from a base station an uplink control channel resource for report of HARQ acknowledgment information related to downlink data transmission on an unlicensed carrier; and a reporting unit configured to report the HARQ acknowledgment information within a predefined deferral window by using the uplink control channel resource, the predefined deferral window specifying a minimum delay and a maximum delay for report of the HARQ acknowledgment information.

In some embodiments, the HARQ acknowledgment information includes one or more pieces of HARQ acknowledgment information within a predefined report window.

In some embodiments, the uplink control channel resource comprises an uplink control channel resource on an unlicensed carrier.

In some embodiments, the unlicensed carrier on which the HARQ acknowledgment information is reported is the same as or different from the unlicensed carrier on which the downlink data transmission is performed.

In some embodiments, the uplink control channel resource includes the same uplink control channel resource that is reserved by the base station for a plurality of downlink data transmissions for the UE.

In some embodiments, the reporting unit is further configured to: in response to being scheduled for downlink data transmission in a first subframe, detecting a transmission status of the unlicensed carrier in a plurality of subframes subsequent to the first subframe; and in response to the transmission status of the unlicensed carrier being a free status in one of the plurality of subframes, reporting the HARQ acknowledgment information on the unlicensed carrier.

In some embodiments, the uplink control channel resource includes an uplink control channel resource that is independently configured by the base station for each downlink data transmission for the UE.

In some embodiments, the reporting unit is further configured to: in response to being scheduled for downlink data transmission in a second subframe, detect a transmission status of the unlicensed carrier in a predefined subframe subsequent to the second subframe; and in response to the transmission status of the unlicensed carrier being a free status in the predefined subframe, report the HARQ acknowledgment information on the unlicensed carrier.

In some embodiments, the unlicensed carrier on which the HARQ acknowledgment information is reported includes one of a plurality of candidate unlicensed carriers that are pre-configured by the base station.

In some embodiments, the plurality of candidate unlicensed carriers at least includes a first unlicensed carrier and a second unlicensed carrier, and the first unlicensed carrier includes the unlicensed carrier on which the downlink data transmission is performed, the second unlicensed carrier being different from the first unlicensed carrier.

In some embodiments, the uplink control channel resource includes the same uplink control channel resource that is reserved by the base station for a plurality of downlink data transmissions for the UE.

In some embodiments, the reporting unit is further configured to: in response to being scheduled for downlink data transmission in a first subframe, detect a transmission status of each of the plurality of candidate unlicensed carriers in a plurality of subframes subsequent to the first subframe; and in response to the transmission status of one of the plurality of candidate unlicensed carriers being a free status in one of the plurality of subframes, report the HARQ acknowledgment information on the one of the plurality of candidate unlicensed carriers.

In some embodiments, the uplink control channel resource comprises an uplink control channel resource independently configured by the base station for each downlink data transmission for the UE.

In some embodiments, the reporting unit is further configured to: in response to being scheduled for downlink data transmission in a second subframe, detect a transmission status of each of the plurality of candidate unlicensed carriers in a predefined subframe subsequent to the second subframe; in response to the transmission status of one of the plurality of candidate unlicensed carriers being a free status in the predefined subframe, report the HARQ acknowledgment information on the one of the plurality of candidate unlicensed carriers.

In some embodiments, the predefined report window is implicitly determined based on the uplink control information format, the number of codewords and the number of aggregated unlicensed carriers for reporting the HARQ acknowledgment information that are used by the UE.

In some embodiments, the apparatus further comprises: a receiving unit configured to receive from the base station a control command which carries an indication of the uplink control channel resource.

In some embodiments, the report window is configured via the control command.

In some embodiments, the uplink control channel resource comprises an uplink control channel resource on a licensed carrier on a serving cell of the UE.

In some embodiments, the receiving unit is further configured to receive from the base station a trigger command which instructs the UE to switch from the unlicensed carrier to the licensed carrier so as to report the HARQ acknowledgment information on the licensed carrier in a predefined uplink subframe.

In some embodiments, the trigger command carries an indication of the uplink control channel resource at the licensed carrier.

In some embodiments, the indication of the uplink control channel resource comprises an index of the uplink control channel resource and an index of the predefined uplink subframe.

In some embodiments, the indication of the uplink control channel resource comprises an index of the uplink control channel resource, and an index of the predefined uplink subframe is determined based on a position of a subframe where the trigger command is transmitted.

The embodiments of the present disclosure may increase the reliability and reduce the latency of HARQ acknowledgment information feedback. In addition, the embodiments of the present disclosure may not only be applied for LAA scenarios, but also may be extended to standalone LAA access scenarios on unlicensed carriers. Furthermore, the embodiments of the present disclosure may offload PUCCH transmission to LAA secondary cells on unlicensed carriers.

BRIEF DESCRIPTION OF THE DRAWINGS

Through the detailed description in the accompanying drawings, features, advantages and other aspects of the embodiments of the present disclosure will become more apparent. Several embodiments of the present disclosure are illustrated schematically, rather than limiting the present disclosure. In the drawings.

DETAILED DESCRIPTION

Principles of the subject matter described herein are now described with reference to several embodiments. It should be understood that the embodiments are described only for causing those skilled in the art to better understand and further implement the subject matter, rather than limiting the scope of the subject matter in any way.

The term "base station" (BS) used here may represent a node B (NodeB or NB), an Evolved Node B (eNodeB or eNB), a remote radio unit (RRU), a radio head (RH), a remote radio head (RRH), a repeater, or a low power node such as a Picocell, a Femto cell and the like.

The term "user equipment" (UE) used here refers to any device that can communicate with the BS. As an example, the UE may comprise a terminal, a mobile terminal (MT), a subscriber station (SS), a portable subscriber station (PSS), a mobile station (MS) or an access terminal (AT).

Figure 1:
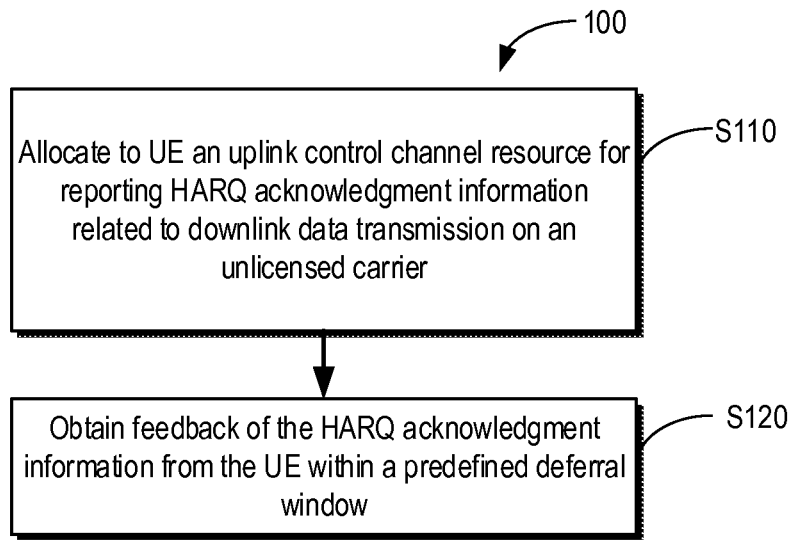
FIG. 1 shows a flowchart of a method of obtaining feedback of HARQ acknowledgment information according to a first aspect of the embodiments of the present disclosure.

According to a first aspect of the embodiments of the present disclosure, there is provided a method for obtaining feedback of HARQ acknowledgment information. FIG. 1 shows a flowchart of a method 100 for obtaining feedback of HARQ acknowledgment information according to a first aspect of the embodiments of the present disclosure. The method 100 may be executed by an eNB in a wireless communication network, and in particular, the method 100 may be executed by an apparatus 800, which will be described with reference to FIG. 8 hereinafter.

The method 100 starts at block S110. At block S110, the eNB allocates to user equipment (UE) an uplink control channel resource for report of HARQ acknowledgment information related to downlink data transmission on an unlicensed carrier. Examples of the downlink data transmission include, but are not limited to, physical downlink shared channel (PDSCH) transmission. Examples of the uplink control channel resource for report of HARQ acknowledgment information related to downlink data transmission on an unlicensed carrier include, but are not limited to, a physical uplink control channel (PUCCH) resource. Examples of the HARQ acknowledgment information include, but are not limited to, HARQ acknowledgment (HARQ-ACK) and HARQ negative acknowledgment (HARQ-NACK).

At block S120, the eNB obtains the feedback of HARQ acknowledgment information within a predefined deferral window. The predefined deferral window specifies a minimum delay and a maximum delay for report of HARQ acknowledgment information.

The eNB may predefine the minimum delay and the maximum delay, or semi-statically or dynamically configure the minimum delay and the maximum delay through the UE's serving cell via a control signaling. Examples of the control signaling include, but are not limited to, radio resource control (RRC) signaling and layer 1 (L1) signaling. As one example, the minimum delay may be 4 ms, and the maximum delay may be 40 ms or 400 ms. It should be understood the minimum delay and the maximum delay may take any appropriate values, and the scope of the present disclosure is not limited in this regard.

If pending HARQ acknowledgment information cannot be reported to the serving base station within the deferral window, then the UE drops the feedback of HARQ acknowledgment information. As used herein, the "pending HARQ acknowledgment information" refers to HARQ acknowledgment information related to downlink data transmission on an unlicensed carrier which should be reported to the eNB but have not been reported yet.

In some embodiments, the HARQ acknowledgment information includes one or more pieces of HARQ acknowledgment information within a predefined report window. According to the present disclosure, the predefined report window may indicate which pending HARQ acknowledgment information may be reported after the UE grabs the channel. In other words, the UE may decide, based on the predefined report window, whether to report all pending HARQ acknowledgment information or only part of all pending HARQ acknowledgment information to the eNB.

In some embodiments, allocating to the UE an uplink control channel resource comprises allocating to the UE the uplink control channel resource on an unlicensed carrier. In other words, the UE reports the HARQ acknowledgment information on the unlicensed carrier. In this case, the predefined report window may be implicitly determined based on the uplink control information (UCI) format, the number of codewords and the number of aggregated unlicensed carriers for report of HARQ acknowledgment information that are used by the UE.

In some embodiments, the eNB configures the report window via a control signaling. Examples of the control signaling include, but are not limited to, radio resource control (RRC) signaling and layer 1 (L1) signaling.

Figure 2:
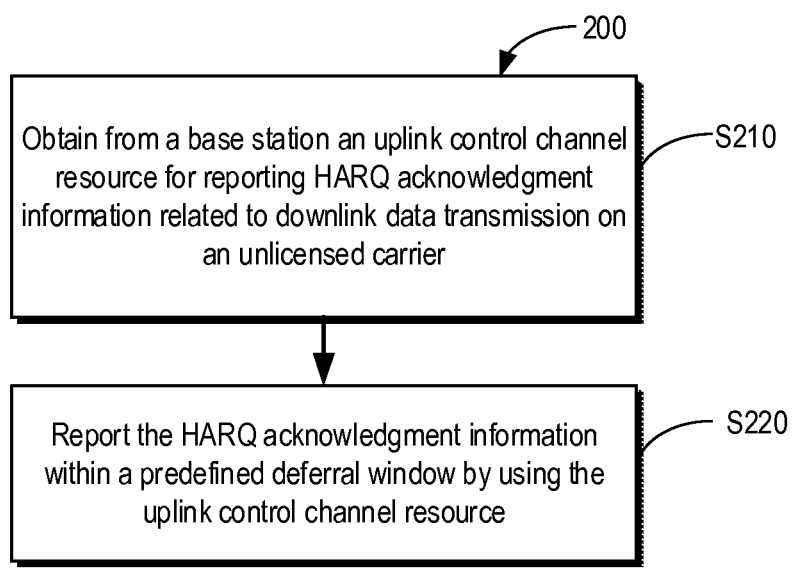
FIG. 2 shows a flowchart of a method of reporting HARQ acknowledgment information according to a second aspect of the embodiments of the present disclosure.

According to a second aspect of the embodiments of the present disclosure, there is provided a method for reporting HARQ acknowledgment information. FIG. 2 shows a flowchart of a method 200 for reporting HARQ acknowledgment information according to a second aspect of the embodiments of the present disclosure. The method 200 may be executed by UE in a wireless communication network, and in particular, the method 200 may be executed by an apparatus 900, which will be described with reference to FIG. 9 later.

The method 200 starts at block S210. At block S210, the UE obtains from the eNB an uplink control channel resource for report of HARQ acknowledgment information related to downlink data transmission on an unlicensed carrier.

At block S220, the UE reports the HARQ acknowledgment information within a predefined deferral window by using the uplink control channel resource. The predefined deferral window specifies a minimum delay and a maximum delay for report of HARQ acknowledgment information. As described above, if pending HARQ acknowledgment information cannot be reported to the serving base station within the deferral window, then the UE drops the feedback of HARQ acknowledgment information.

In some embodiments, the UE reports the HARQ acknowledgment information related to downlink data transmission on an unlicensed carrier in a LAA SCell. In other embodiments, the UE reports the HARQ acknowledgment information related to downlink data transmission on an unlicensed carrier in a LAA PCell.

Hereinafter, details of the methods 100 and 200 will be described with reference to three embodiments according to the present disclosure. As described above, examples of the downlink data transmission include, but are not limited to, PDSCH transmission; examples of the uplink control channel resource for report of HARQ acknowledgment information related to downlink data transmission on an unlicensed carrier include, but are not limited to, a PUCCH resource. Although the PDSCH transmission and PUCCH resource will be used as an example to describe the three embodiments according to the present disclosure, those skilled in the art may appreciate the solution according to the present disclosure may also be applied to other downlink data transmission and other uplink control channel resources. The scope of the present disclosure is not limited in this regard.

First Embodiment

In the first embodiment, allocating to the UE the uplink control channel resource comprises allocating to the UE the uplink control channel resource on an unlicensed carrier. Accordingly, the UE reports HARQ acknowledgment information related to PDSCH transmission on an unlicensed carrier in the LAA Scell. In addition, in the first embodiment, the unlicensed carrier comprises an unlicensed carrier on which PDSCH transmission is performed. In other words, the UE reports the HARQ acknowledgment information on the same unlicensed carrier as the unlicensed carrier on which PDSCH transmission is performed.

According to the first embodiment, if the UE cannot grab the channel in the LAA SCell in a subframe where the HARQ acknowledgment information needs to be transmitted, the reporting of HARQ acknowledgment information is deferred on the same unlicensed carrier. To this end, two alternative solutions may be for resource allocation of PUCCH in order to avoid collision of PUCCH resources among multiple UEs due to deferral of HARQ acknowledgment information feedback.

First Alternative Solution

In the first alternative solution, the eNB reserves the same PUCCH resource for multiple PDSCH transmissions for the UE.

Once one UE is scheduled for PDSCH transmission in a LAA SCell, the eNB will reserve the same PUCCH resource for the HARQ acknowledgment information feedback, with respect to subsequent multiple PDSCH transmissions for the UE.

The eNB may transmit to the UE a control signaling that carries an indication of the allocated PUCCH resource in the LAA SCell. Examples of the control signaling include, but are not limited to, radio resource control (RRC) signaling and layer 1 (L1) signaling. As one example, the eNB semi-statically configures, through RRC signaling, the PUCCH resource for HARQ acknowledgment information feedback in the LAA SCell. As another example, the eNB dynamically configures, through L1 signaling in downlink control information (DCI), the PUCCH resource for HARQ acknowledgment information feedback in the LAA SCell. Examples of the indication of the PUCCH resource include, but are not limited to, index of the PUCCH resource.

If the UE grabs the channel in one of subframes subsequent to the subfame in which PDSCH transmission is performed, the UE reports to the eNB the pending HARQ acknowledgment information within the predefined report window through uplink control information (UCI) by using the reserved PUCCH resource.

Figure 3:
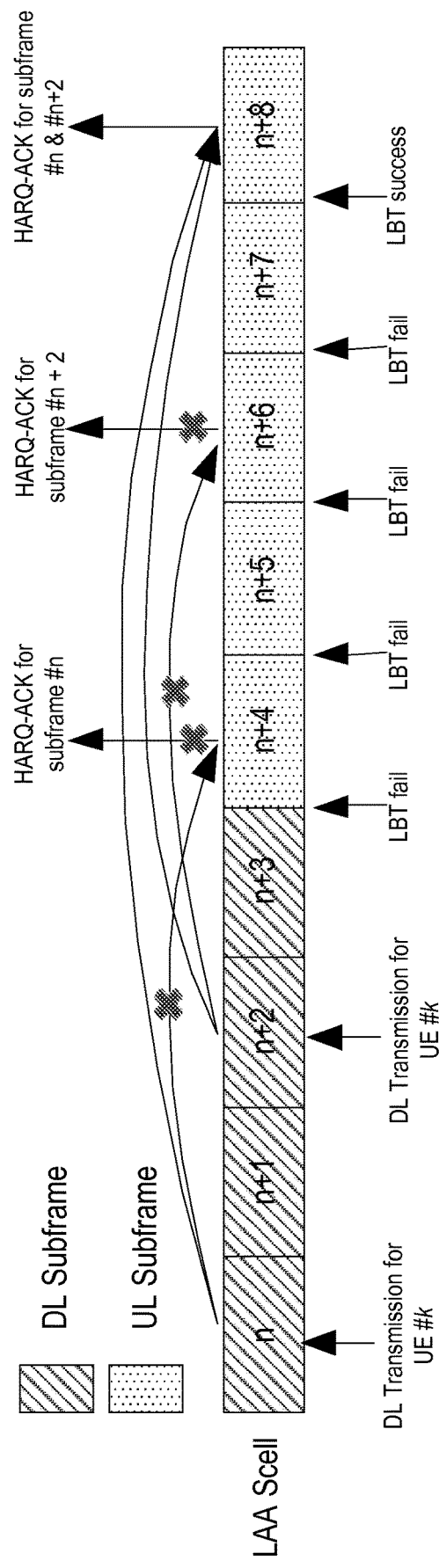
FIG. 3 shows HARQ timing in an LAA SCell according to one alternative solution of the embodiments of the present disclosure.

FIG. 3 schematically shows HARQ timing in a LAA SCell according to the first alternative solution.

As shown in FIG. 3, UE #k is scheduled for downlink data transmission in subframes #n and #n+2 on an unlicensed carrier. It is assumed that the HARQ acknowledgment information related to downlink data transmission in subframes #n and #n+2 will generally be reported in subframes #n+4 and #n+6 in the LAA SCell according to legacy HARQ timing procedure on licensed carriers.

As the LBT fails before transmission of the subframes #n+4 and #n+6, the report of HARQ acknowledgment information related to downlink data transmission in subframe #n and subframe #n+2 will be deferred on the same unlicensed carrier until LBT succeeds in one of the subsequent UL subframes (i.e. subframe #n+8) as shown in FIG. 3.

Once the UE grabs the channel, the UE reports to the eNB the HARQ acknowledgment information related to downlink data transmission in subframe #n and subframe #n+2 by using the reserved PUCCH resource.

Second Alternative Solution

In the second alternative solution, the eNB independently configures the PUCCH resource for each PDSCH transmission for the UE in the LAA SCell. As one example, the eNB configures, via L1 signaling in DCI, the PUCCH resource for HARQ acknowledgment information feedback in the LAA SCell.

If the UE cannot grab the channel in the LAA SCell in a subframe where the HARQ acknowledgment information needs to be reported according to legacy HARQ timing procedure, the HAQR acknowledgment information will be deferred to be reported on the same unlicensed carrier until the UE grabs the channel in a predefined UL subframe. In this case, the PUCCH resource allocated for the HARQ acknowledgment information feedback in a subframe, in which the UE grabs the channel, is utilized to report the pending HARQ acknowledgment information within the predefined report window.

Figure 4:
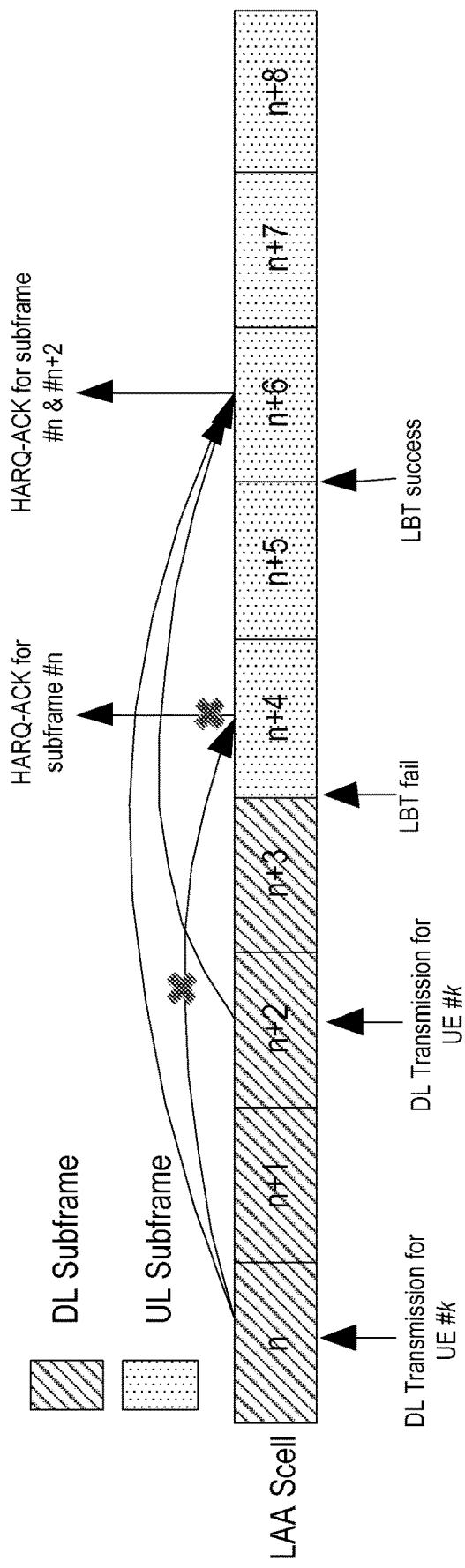
FIG. 4 shows HARQ timing in an LAA SCell according to another alternative solution of the embodiments of the present disclosure.

FIG. 4 schematically shows HARQ timing in a LAA SCell according to the second alternative solution.

As shown in FIG. 4, UE #k is scheduled for downlink data transmission in subframes #n and #n+2 on an unlicensed carrier. The HARQ acknowledgment information related to downlink data transmission in subframes #n and #n+2 will generally be reported in subframes #n+4 and #n+6 in the LAA SCell according to legacy HARQ timing procedure on licensed carriers.

As the LBT fails before the subframe #n+4, the report of HARQ acknowledgment information related to downlink data transmission in subframe #n will be deferred on the same unlicensed carrier until the LBT succeeds in subframe #n+6 in which only the HARQ acknowledgment information related to downlink data transmission in subframe #n+2 needs to be reported based on legacy HARQ timing procedure.

According to the second alternative solution, once the UE grabs the channel in subframe #n+6, the UE reports to the eNB the HARQ acknowledgment information related to downlink data transmission in subframe #n and subframe #n+2 by using the reserved PUCCH resource.

It can be seen from the comparison between the first alternative solution and the second alternative solution, the first alternative solution will have more transmission opportunities of HARQ acknowledgment information feedback and less latency. In addition, the second alternative solution needs to reserve specific PUCCH resources for the UE after scheduling it, which limits the scheduling flexibility if available PUCCH resources are not sufficient.

Second Embodiment

To reduce the latency and increase the reliability of HARQ acknowledgment information feedback, in the second embodiment, the feedback of HARQ acknowledgment information related to PDSCH transmission on an unlicensed carrier may be dynamically switched between an unlicensed carrier in a LAA SCell and a licensed carrier in a licensed cell (e.g. PCell).

In general, the UE reports HARQ acknowledgment information of the serving cell on unlicensed carriers through a LAA SCell. If a PUCCH resource is available on a licensed carrier in the serving cell in a predefined UL subframe, the serving eNB may send to the UE a trigger command. The trigger command instructs the UE to switch from the unlicensed carrier to the licensed carrier so as to report HARQ acknowledgment information. Examples of the trigger command include, but are not limited to, L1 signaling. The trigger command may carry an indication of the PUCCH resource on the licensed carrier.

As one example, the indication of the PUCCH resource includes an index of the PUCCH resource and an index of the predefined uplink subframe.

As another example, the indication of the PUCCH resource includes an index of the PUCCH resource. An index of the predefined uplink subframe is determined based on a position of a subframe where the trigger command is transmitted. For example, if the trigger command is transmitted in subframe #n of PCell, then the first subframe (i.e. subframe #n+1) after the subframe #n may be utilized to report the HARQ acknowledgment information. It may be appreciated that the $m^{th}$ subframe after the subframe where the trigger command is transmitted may be predefined for report of the HARQ acknowledgment information, where m is a positive integer that is larger than or equal to 1. The scope of the present disclosure is not limited in this regard.

Figure 5:
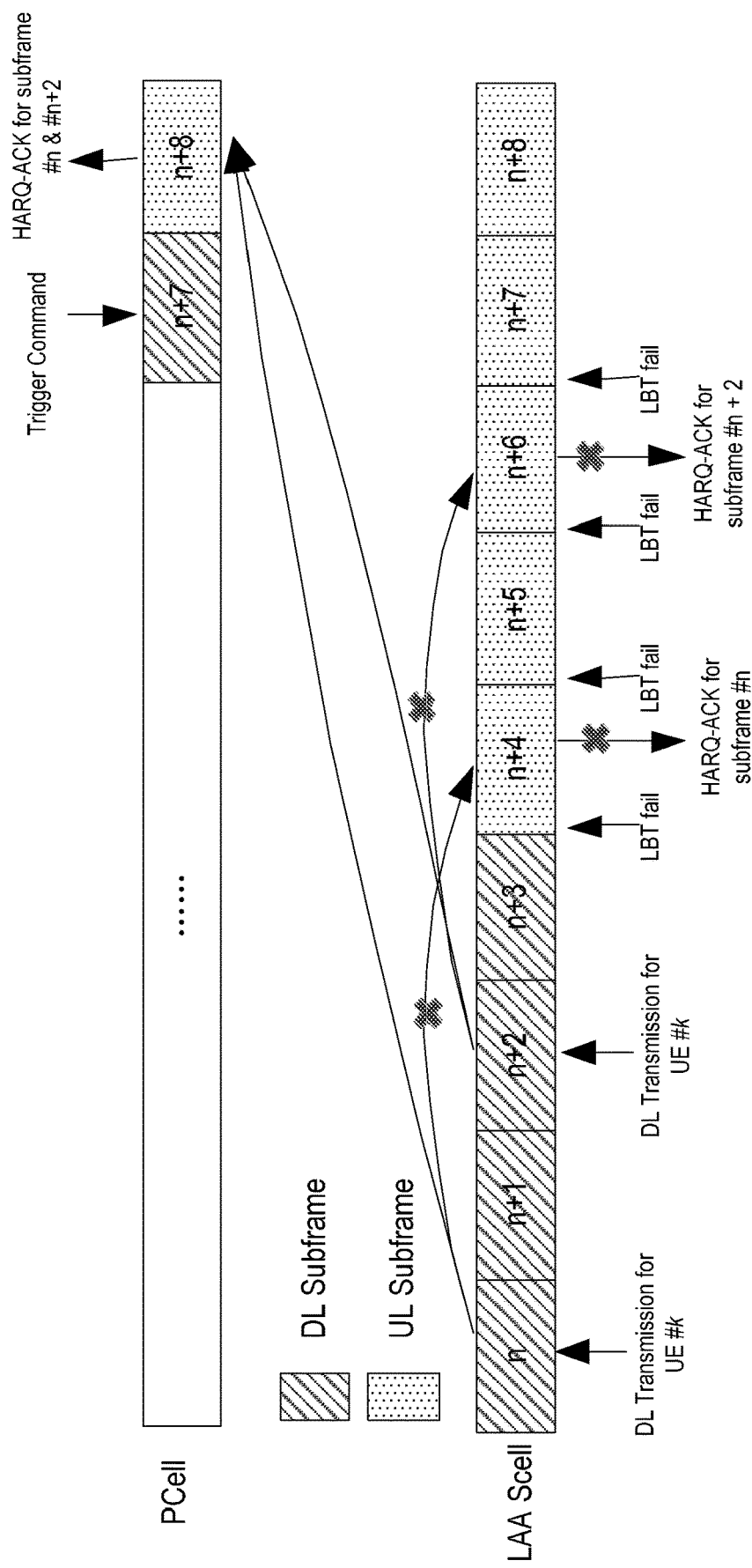
FIG. 5 shows HARQ timing in an LAA SCell according to a further alternative solution of the embodiments of the present disclosure.

FIG. 5 schematically shows HARQ timing in a LAA SCell according to the second embodiment.

As shown in FIG. 5, UE #k is scheduled for downlink data transmission in subframe #n and subframe #n+2 on an unlicensed carrier. In general, the HARQ acknowledgment information related to downlink data transmission in subframes #n and #n+2 is supposed to be reported in subframe #n+4 and subframe #n+6 in the LAA SCell according to legacy HARQ timing procedure on licensed carriers.

As the LBT fails for each subframe before subframes #n+4 to #n+7, the report of HARQ acknowledgment information related to downlink data transmission in subframe #n and subframe #n+2 will be deferred on the same unlicensed carrier until the LBT succeeds.

According to the legacy HARQ timing procedure, only the HARQ acknowledgment information related to downlink data transmission in subframe #n+2 needs to be reported in subframe #n+6.

Because the HARQ acknowledgment information related to downlink data transmission in subframe #n and subframe #n+2 is still deferred to be reported in subframe #n+7, according to the second embodiment, the eNB sends a trigger signaling to UE #k via L1 signaling to trigger reporting of the pending HARQ acknowledgment information from LAA SCell to PCell in subframe #n+8 if it is determined the PUCCH resource is available in the PCell.

After receiving the trigger command, UE #k will report the pending HARQ acknowledgment information, e.g. the HARQ acknowledgment information related to downlink data transmission in subframe #n and subframe #n+2, to the eNB through PCell in subframe #n+8 by using the configured PUCCH resource.

Third Embodiment

To further increase the opportunity of HARQ acknowledgment information feedback in a LAA SCell, in the third embodiment, the eNB may pre-configure multiple LAA SCells (i.e. multiple unlicensed carriers) for joint HARQ acknowledgment information feedback through control signaling (e.g. RRC signaling).

In this case, the UE may report the pending HARQ acknowledgment information within a predefined report window through one of multiple candidate unlicensed carriers only if the UE grabs the channel on this unlicensed carrier. To this end, the following two alternative solutions may be for the allocation of PUCCH resources so as to avoid collision of PUCCH resources among multiple UEs due to the latency of HARQ acknowledgment information.

First Alternative Solution

It may be understood that in terms of the allocation of PUCCH resources, the first alternative solution of the three embodiment is similar to the first alternative solution of the first embodiment as described above with reference to FIG. 3.

Specifically, the eNB reserves the same PUCCH resource for the HARQ acknowledgment information feedback in multiple candidate LAA SCells. The eNB may signal the indication of the PUCCH resource (e.g. index of PUCCH resource) to the UE via L1 signaling or higher layer RRC signaling.

If the UE is scheduled in the first subframe for downlink data transmission, the UE may detect a transmission status of each of the multiple unlicensed carriers in multiple subframes subsequent to the first subframe. If the transmission status of one of the multiple unlicensed carriers is a free status in one of the multiple subframes, then the UE may report the pending HARQ acknowledgment information within a predefined report window on the one unlicensed carrier by using the reserved PUCCH resource.

Figure 6:
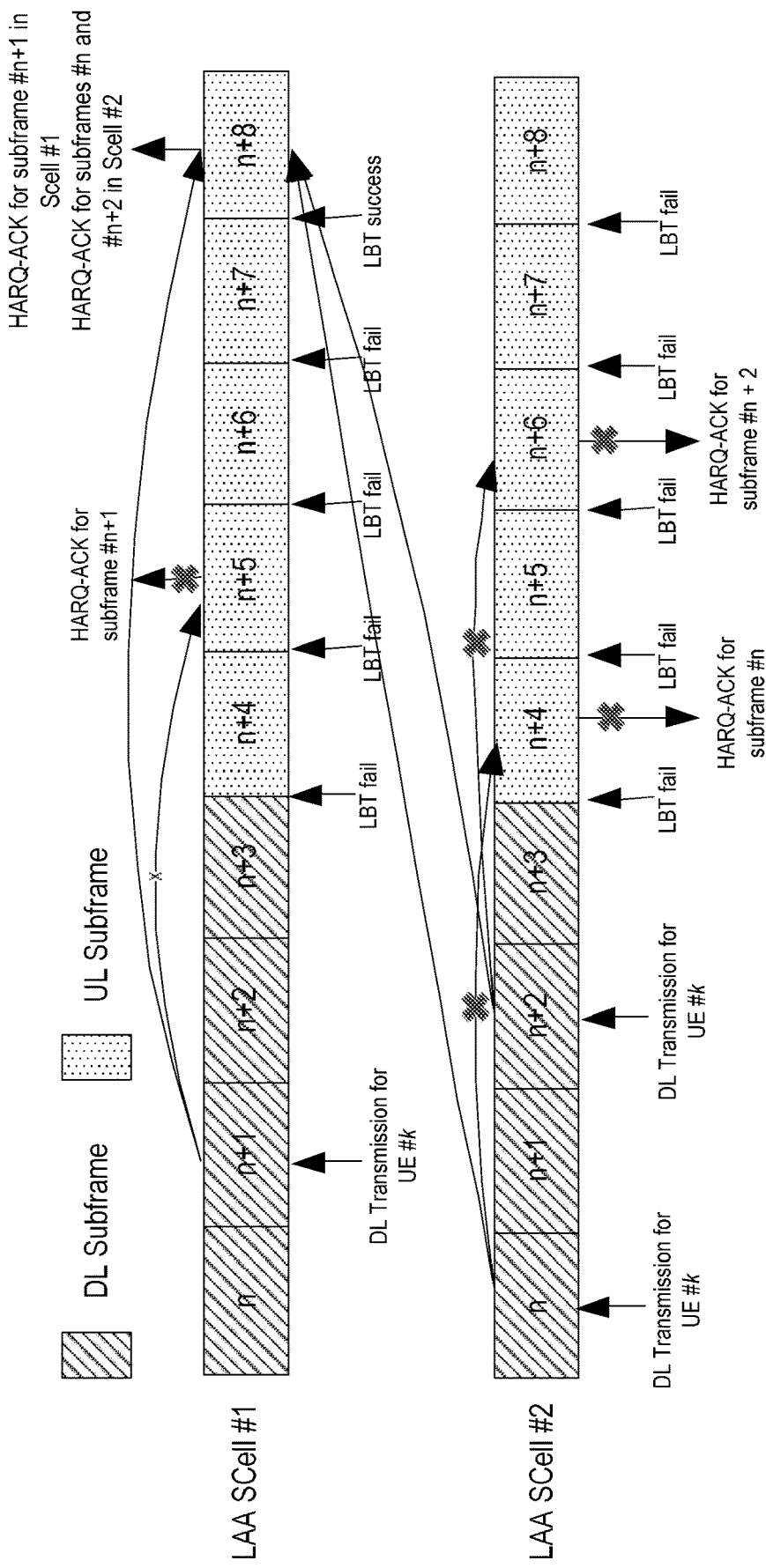
FIG. 6 shows HARQ timing in an LAA SCell according to a still further alternative solution of the embodiments of the present disclosure.

FIG. 6 schematically shows HARQ timing in a LAA SCell according to the first alternative solution.

As shown in FIG. 6, two LAA SCells (LAA SCells #1 and #2) are configured for joint HARQ acknowledgment information feedback through higher layer RRC signaling. UE #k is scheduled for downlink data transmission in subframe #n+1 in LAA SCell #1, and in subframe #n and subframe #n+2 in LAA SCell #2.

According to legacy HARQ timing procedure on licensed carriers, HARQ acknowledgment information related to downlink data transmission in subframe #n+1 are typically supposed to be reported in subframe #5 in LAA SCell #1, and HARQ acknowledgment information related to downlink data transmission in subframes #n and #n+2 are supposed to be reported in subframes #n+4 and #n+6 in LAA SCell #2 respectively.

According to the first alternative solution, the eNB reserves the same PUCCH resource for HARQ acknowledgment information feedback for the UE in multiple candidate LAA SCells.

If the HARQ acknowledgment information related to PDSCH transmission in any of the multiple candidate LAA SCells needs to be reported in a UL subframe, UE #k will independently detect a transmission status of each of the multiple candidate LAA SCells.

For example, as shown in FIG. 6, if the HARQ acknowledgment information needs to be reported in subframe #n+4 for LAA SCell #2, the UE will perform LBT before feedback of HARQ acknowledgment information in subframe #n+4 in both LAA SCell #1 and LAA SCell #2. As UE #k cannot grab the channel in both LAA SCells #1 and #2, the HARQ acknowledgment information feedback will be deferred on the two candidate unlicensed carriers until the LBT succeeds in any of LAA SCells #1 and #2 in one of subsequent UL subframes.

As illustrated in FIG. 6, the feedback of HARQ acknowledgment information related to PDSCH transmission in subframe #n+1 in LAA SCell #1 and in subframe # n and subframe #n+2 in LAA SCell #2 will be deferred until the UE grabs the channel in LAA SCell #1 in subframe #n+8. Then, UE #k reports the two pieces of pending HARQ acknowledgment information to the serving eNB in subframe #n+8 in LAA SCell #1 by using the reserved PUCCH resource.

Second Alternative Solution

It may be understood that in terms of PUCCH resource allocation, the second alternative solution of the third embodiment is similar to the second alternative solution of the first embodiment as described above with reference to FIG. 4.

In the second alternative solution, the eNB independently configures a PUCCH resource for each PDSCH transmission on multiple SCells for the UE. As one example, the eNB configures PUCCH resources for HARQ acknowledgment information feedback on multiple LAA SCells through L1 signaling in DCI. The UE will try to grab the channel for joint HARQ acknowledgment information feedback for multiple LAA SCells only in the predefined subframes in which HARQ acknowledgment information need to be reported according to legacy HARQ timing procedure.

If the UE is scheduled for downlink data transmission in the first subframe, the UE detects a transmission status of each of the multiple LAA SCells in multiple subframes subsequent to the first subframe. If the transmission status of one of the multiple LAA SCells is a free status in one of the multiple subframes, the UE reports the pending HARQ acknowledgment information within the predefined report window in the LAA SCell.

Figure 7:
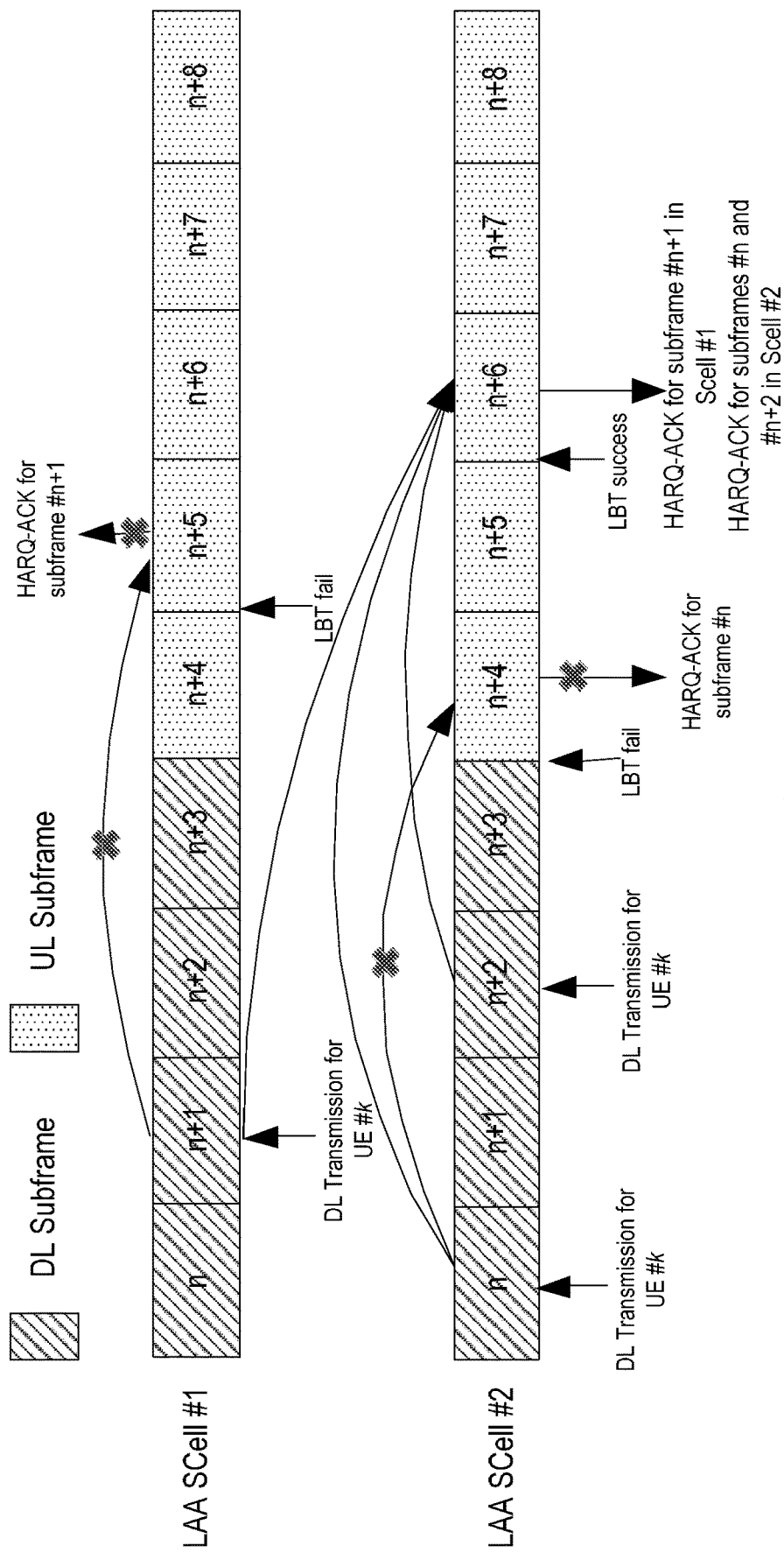
FIG. 7 shows HARQ timing in an LAA SCell according to a still further alternative solution of the embodiments of the present disclosure.

FIG. 7 schematically shows HARQ timing in a LAA SCell according to the second alternative solution.

As shown in FIG. 7, two LAA SCells (LAA SCells #1 and #2) are configured for joint HARQ acknowledgment information feedback through higher layer RRC signaling. UE #k is scheduled for downlink data transmission in subframe #n+1 in LAA SCell #1, and in subframe #n and subframe #n+2 in LAA SCell #2.

For legacy HARQ timing procedure on licensed carriers, HARQ acknowledgment information related to downlink data transmission in subframe #n+1 is generally supposed to be reported in subframe #5 in LAA SCell #1, and HARQ acknowledgment information related to downlink data transmission in subframes #n and #n+2 is generally supposed to be reported in subframes #n+4 and #n+6 on LAA SCell #2.

According to the second alternative solution, as shown in FIG. 7, UE #k will perform LBT before UL transmission in subframe #n+5 in SCell #1, and in subframe #n+4 and subframe #n+5 in SCell #2. As UE #k fails to grab the channel in subframe #n+5 in LAA SCell #1 and in subframe #n+4 in LAA SCell #2, the feedback of HARQ acknowledgment information related to PDSCH transmission in subframe #n+1 in LAA SCell #1 and in subframe #n in LAA SCell #2 will be deferred until the UE grabs the channel in subframe #n+6 in LAA SCell #2. Subsequently, the UE reports the pending HARQ acknowledgment information for these two LAA SCells to the serving eNB in subframe #n+6 in LAA SCell #2 by using the PUCCH resource for reporting HARQ acknowledgment information as configured in subframe #n+6 in LAA SCell #2.

The above described first, second and third embodiments according to the present disclosure may be independently used or combined for support of HARQ acknowledgment information feedback in LAA SCells. In addition, the solutions according to the present disclosure can not only be for LAA scenarios, but also can be extended to standalone LAA access scenarios on unlicensed carriers.

Figure 8:
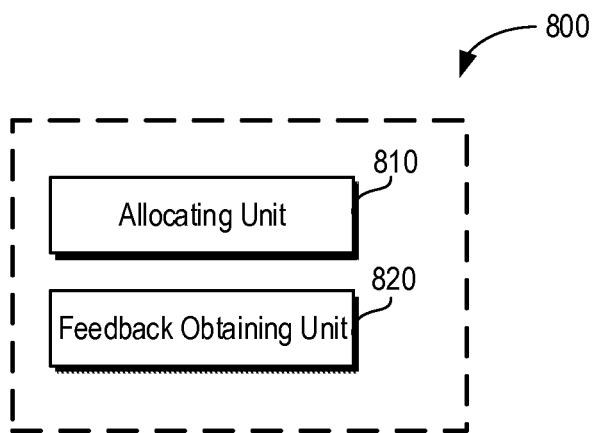
FIG. 8 shows a block diagram of an apparatus for obtaining feedback of HARQ acknowledgment information according to a third aspect of the embodiments of the present disclosure.

According to a third aspect of the embodiments of the present disclosure, there is provided an apparatus for obtaining hybrid automatic repeat request HARQ acknowledgment information feedback. FIG. 8 shows a block diagram of an apparatus 800 for obtaining feedback of HARQ acknowledgment information according to a third aspect of the embodiments of the present disclosure. The apparatus 800 may be implemented in an eNB, for example.

As shown in FIG. 8, the apparatus 800 comprises: an allocating unit 810 configured to allocate to user equipment (UE) an uplink control channel resource for report of HARQ acknowledgment information related to downlink data transmission on an unlicensed carrier; and a feedback obtaining unit 820 configured to obtain feedback of the HARQ acknowledgment information from the UE within a predefined deferral window, the predefined deferral window specifying a minimum delay and a maximum delay for report of the HARQ acknowledgment information.

Figure 9:
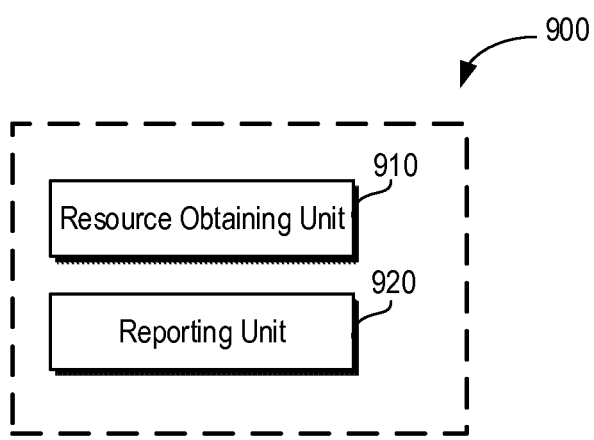
FIG. 9 shows a block diagram of an apparatus for reporting HARQ acknowledgment information according to a fourth aspect of the embodiments of the present disclosure.

In a fourth aspect, there is provided an apparatus for reporting HARQ acknowledgment information. FIG. 9 shows a block diagram of an apparatus 900 for reporting HARQ acknowledgment information according to a fourth aspect of the embodiments of the present disclosure. The apparatus 900 may be implemented in UE, for example.

As shown in FIG. 9, the apparatus 900 comprises: a resource obtaining unit 910 configured to obtain from a base station an uplink control channel resource for report of HARQ acknowledgment information related to downlink data transmission on an unlicensed carrier; and a reporting unit 920 configured to report the HARQ acknowledgment information within a predefined deferral window by using the uplink control channel resource, the predefined deferral window specifying a minimum delay and a maximum delay for report of the HARQ acknowledgment information.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Various blocks in the flowcharts may be regarded as method steps and/or operations generated by operations of computer program code, and/or construed as multiple coupled logic circuit elements performing relevant functions. For example, the embodiments of the present disclosure comprise a computer program product, which includes a computer program tangibly embodied on a machine readable medium, the computer program including program code configured to implement the methods described above.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Various modifications and alterations to the exemplary embodiments of the present disclosure will become apparent to those skilled in the art from the foregoing description when taken in conjunction with the accompanying drawings. Any and all modifications are still to fall under the non-limiting scope of the exemplary embodiments of the present disclosure. In addition, the foregoing specification and accompanying drawings offer such an advantage as motivating those skilled in the art related to these embodiments of the present disclosure to devise other embodiments of the present disclosure depicted herein.

It is to be appreciated the embodiments of the present disclosure are not limited to these specific embodiments disclosed herein, and modifications and other embodiments should be included in the scope of the appended claims. Although specific terms are employed here, they are merely used in a broad and descriptive sense, rather than for the limitation purpose.

We claim:

1. A method of obtaining feedback of hybrid automatic repeat request (HARQ) acknowledgment information, comprising:
    allocating to a user equipment (UE) an uplink control channel resource for reporting HARQ acknowledgment information related to a downlink data transmission on an unlicensed carrier; and
    obtaining feedback of the HARQ acknowledgment information from the UE within a predefined deferral window, the predefined deferral window specifying a minimum delay and a maximum delay for reporting the HARQ acknowledgment information;
    wherein allocating to the UE the uplink control channel resource comprises allocating to the UE the uplink control channel resource on the unlicensed carrier.

2. The method according to claim 1, wherein the HARQ acknowledgment information includes one or more pieces of HARQ acknowledgment information within a predefined report window.

3. The method according to claim 1, wherein the unlicensed carrier on which the HARQ acknowledgment information is reported includes one of a plurality of candidate unlicensed carriers that are pre-configured.

4. The method according to claim 1, wherein allocating to the UE the uplink control channel resource comprises:
    reserving the same uplink control channel resource for a plurality of downlink data transmissions of the UE.

5. The method according to claim 4, wherein reserving the same uplink control channel resource for the plurality of downlink data transmissions of the UE comprises:
    in response to scheduling one of the plurality of downlink data transmissions for the UE in a first subframe, reserving the same uplink control channel resource for the UE in a plurality of subframes subsequent to the first subframe.

6. The method according to claim 2, wherein the predefined report window is implicitly determined based on an uplink control information (UCI) format, the number of codewords, and the number of aggregated unlicensed carriers for reporting of the HARQ acknowledgment information that are used by the UE.

7. A method of reporting hybrid automatic repeat request (HARQ) acknowledgment information, comprising:
    obtaining from a base station an uplink control channel resource for reporting of HARQ acknowledgment information related to a downlink data transmission on an unlicensed carrier; and
    reporting the HARQ acknowledgment information within a predefined deferral window using the uplink control channel resource, the predefined deferral window specifying a minimum delay and a maximum delay for reporting of the HARQ acknowledgment information;
    wherein obtaining from the base station the uplink control channel resource includes obtaining from the base station the uplink control channel resource on the unlicensed carrier.

8. The method according to claim 7, wherein the HARQ acknowledgment information includes one or more pieces of HARQ acknowledgment information within a predefined report window.

9. The method according to claim 7, wherein the uplink control channel resource includes the same uplink control channel resource that is reserved by the base station for a plurality of downlink data transmissions of the UE.

10. The method according to claim 9, wherein reporting the HARQ acknowledgment information comprises:
    in response to being scheduled for the downlink data transmission in a first subframe, detecting a transmission status of the unlicensed carrier in a plurality of subframes subsequent to the first subframe; and
    in response to the transmission status of the unlicensed carrier being a free status in one of the plurality of subframes, reporting the HARQ acknowledgment information on the unlicensed carrier.

11. The method according to claim 7, wherein the unlicensed carrier on which the HARQ acknowledgment information is reported includes one of a plurality of candidate unlicensed carriers that are pre-configured by the base station.

12. The method according to claim 11, wherein reporting the HARQ acknowledgment information comprises:

in response to being scheduled for the downlink data transmission in a first subframe, detecting a transmission status of each of the plurality of candidate unlicensed carriers in a plurality of subframes subsequent to the first subframe; and in response to the transmission status of one of the plurality of candidate unlicensed carriers being a free status in one of the plurality of subframes, reporting the HARQ acknowledgment information on the one of the plurality of candidate unlicensed carriers.

13. The method according to claim 8, wherein the predefined report window is implicitly determined based on an uplink control information format, the number of codewords, and the number of aggregated unlicensed carriers for reporting of the HARQ acknowledgment information that are used by the UE.

14. An apparatus for obtaining feedback of hybrid automatic repeat request (HARQ) acknowledgment information, comprising:
at least one processor; and
at least one memory including computer program code;
wherein the at least one memory and computer program code are configured to, with the at least one processor, cause the apparatus to allocate to a user equipment (UE) an uplink control channel resource for reporting of HARQ acknowledgment information related to a downlink data transmission on an unlicensed carrier; and
wherein the at least on memory and computer program code are configured to, with the at least one processor, cause the apparatus to obtain feedback of the HARQ acknowledgment information from the UE within a predefined deferral window, the predefined deferral window specifying a minimum delay and a maximum delay for reporting of the HARQ acknowledgment information;
wherein the uplink control channel resource includes an uplink control channel resource on the unlicensed carrier.

15. An apparatus for reporting hybrid automatic repeat request (HARQ) acknowledgment information, comprising:
at least one processor; and
at least one memory including computer program code;
wherein the at least one memory and computer program code are configured to, with the at least one processor, cause the apparatus to obtain from a base station an uplink control channel resource for reporting of HARQ acknowledgment information related to a downlink data transmission on an unlicensed carrier;
wherein the at least one memory and computer program code are configured to, with the at least one processor, cause the apparatus to report the HARQ acknowledgment information within a predefined deferral window using the uplink control channel resource, the predefined deferral window specifying a minimum delay and a maximum delay for reporting of the HARQ acknowledgment information;
wherein the uplink control channel resource includes an uplink control channel resource on the unlicensed carrier.

16. The apparatus according to claim 14, wherein the at least one memory and computer program code are configured to, with the at least one processor, cause the apparatus to reserve the same uplink control channel resource for multiple downlink data transmissions of the UE;
wherein the at least one memory and computer program code are configured to, with the at least one processor, cause the apparatus to, in response to scheduling one of the plurality of downlink data transmissions for the UE in a first subframe, reserve the same uplink control channel resource for the UE in a plurality of subframes subsequent to the first subframe.

17. The apparatus according to claim 14, wherein the HARQ acknowledgment information includes one or more pieces of HARQ acknowledgment information within a predefined report window;
wherein the predefined report window is implicitly determined based on an uplink control information (UCI) format, the number of codewords, and the number of aggregated unlicensed carriers for reporting of the HARQ acknowledgment information that are used by the UE.

18. The apparatus according to claim 15, wherein the uplink control channel resource includes the same uplink control channel resource that is reserved for a plurality of downlink data transmissions for the UE;
wherein the at least one memory and computer program code are configured to, with the at least one processor, cause the apparatus to, in response to being scheduled for one of the plurality of downlink data transmissions in a first subframe, detect a transmission status of the unlicensed carrier in a plurality of subframes subsequent to the first subframe;
wherein the at least one memory and computer program code are configured to, with the at least one processor, cause the apparatus to, in response to the transmission status of the unlicensed carrier being a free status in one of the plurality of subframes, report the HARQ acknowledgment information on the unlicensed carrier.

19. The apparatus according to claim 15, wherein the unlicensed carrier on which the HARQ acknowledgment information is reported includes one of a plurality of candidate unlicensed carriers that are pre-configured by the base station;
wherein the at least one memory and computer program code are configured to, with the at least one processor, cause the apparatus to, in response to being scheduled for the downlink data transmission in a first subframe, detect a transmission status of each of the plurality of candidate unlicensed carriers in a plurality of subframes subsequent to the first subframe;
wherein the at least one memory and computer program code are configured to, with the at least one processor, cause the apparatus to, in response to the transmission status of one of the plurality of candidate unlicensed carriers being a free status in one of the plurality of subframes, report the HARQ acknowledgment information on the one of the plurality of candidate unlicensed carriers.

20. The apparatus according to claim 15, wherein the HARQ acknowledgment information includes one or more pieces of HARQ acknowledgment information within a predefined report window;
wherein the predefined report window is implicitly determined based on an uplink control information format, the number of codewords, and the number of aggregated unlicensed carriers for reporting of the HARQ acknowledgment information that are used by the UE.

* * * * *